United States Patent [19]

Wada et al.

[11] Patent Number: 4,607,316
[45] Date of Patent: Aug. 19, 1986

[54] LOW TEMPERATURE SINTERED CERAMIC CAPACITOR WITH HIGH DC BREAKDOWN VOLTAGE, AND METHOD OF MANUFACTURE

[75] Inventors: Takeshi Wada, Harunamachi; Hiroshi Kishi, Fujioka; Shunji Murai; Masami Fukui, both of Harunamachi, all of Japan

[73] Assignee: Taiyo Yuden Co., Ltd., Tokyo, Japan

[21] Appl. No.: 805,094

[22] Filed: Dec. 4, 1985

[30] Foreign Application Priority Data

Dec. 18, 1984 [JP] Japan ................................ 59-267002

[51] Int. Cl.$^4$ .................... H01G 1/005; H01G 4/06; C04B 35/46
[52] U.S. Cl. .................... 361/321; 264/61; 264/65; 264/66; 361/305; 361/306; 501/136
[58] Field of Search ............... 264/61, 65, 66; 361/305, 306, 321; 501/136

[56] References Cited

U.S. PATENT DOCUMENTS 4,109,292 8/1978 Shibayama et al. ............. 361/321
4,115,493 9/1978 Sakabe et al. .................... 264/61
4,438,214 3/1984 Masuyama et al. ............. 501/136

FOREIGN PATENT DOCUMENTS 59-138003 8/1984 Japan .

Primary Examiner—William J. Van Balen
Attorney, Agent, or Firm—Woodcock Washburn Kurtz Mackiewicz & Norris

[57] ABSTRACT

A monolithic ceramic capacitor having a higher DC breakdown voltage per unit thickness of the dielectric ceramic body than heretofore. The major ingredient of the ceramic is expressed as $\{(Ba_{1-x-y}Ca_xSr_y)O\}_k \cdot (Ti_{1-z}Zr_z)O_2$, where x, y, z and k are numerals in the ranges specified herein. To this major ingredient is added a minor proportion of a mixture of boric oxide, silicon dioxide, and lithium oxide. The relative proportions of these additives are also specified. For the fabrication of capacitors having dielectric bodies of the above composition, the moldings of the mixture of the major ingredient and additives in the specified proportions are sintered to maturity in a reductive or neutral atmosphere and then reheated at a lower temperature in an oxidative atmosphere. The sintering temperature can be so low (1000°–1200° C.) that the moldings can be cosintered with base metal electrodes buried therein.

10 Claims, 3 Drawing Figures

United States Patent

Patent Number: 4,607,316
Date of Patent: Aug. 19, 1986

United States Patent

Patent Number: 4,607,316
Date of Patent: Aug. 19, 1986

LOW TEMPERATURE SINTERED CERAMIC CAPACITOR WITH HIGH DC BREAKDOWN VOLTAGE, AND METHOD OF MANUFACTURE

BACKGROUND OF THE INVENTION

Our invention relates to solid dielectric capacitors in general and, in particular, to ceramic capacitors such as those of the monolithic, multilayered configuration that are capable of sintering in a reductive or neutral atmosphere at sufficiently low temperatures to permit cosintering with base metal electrodes for the provision of low cost monolithic capacitors, and to a process for the fabrication of such low temperature sintered capacitors. The ceramic capacitors of our invention are particularly notable for their high DC breakdown voltages per unit thickness of the dielectric body.

Our invention may be considered an improvement of Japanese Laid Open Patent Application No. 59-138003. Described and claimed in in this prior patent application are dielectric ceramic compositions consisting essentially of a major proportion of $\{(Ba_xCa_ySr_z)O\}_k(Ti_nZr_{1-n})O_2$ and a minor proportion of a mixture of lithium oxide ($Li_2O$) and at least one of barium oxide (BaO), calcium oxide (CaO) and strontium oxide (SrO). These ceramic compositions are sinterable to maturity in a reductive or neutral atmosphere. Thus, for the fabrication of monolithic, multilayered ceramic capacitors, for example, the prior art ceramic compositions make possible the cosintering of dielectric ceramic bodies and film electrodes of nickel or like base metal interleaved therein.

The ceramic capacitors fabricated from these prior art materials have one weakness, however, particularly when they are used on motor vehicles. Capacitors for vehicular use must retain their full performance characteristics in a temperature range as wide as from $-50°$ to $+125°$ C. The direct current (DC) breakdown voltages of the capacitors in accordance with the prior art ceramic compositions are only from 13 to 18 volts for each micron of the thickness of the dielectric body at the maximum, 125° C., of the expected working temperature range. A conventional solution to this low breakdown voltage problem has been to increase the total thickness of the dielectric body. Such greater size capacitors are of cource objectionable because of the larger space requirements.

SUMMARY OF THE INVENTION

We have hereby found out how to improve the noted prior art ceramic compositions for the provision of ceramic capacitors having higher DC breakdown voltages per unit thickness of the ceramic body, and how to manufacture such ceramic capacitors of the improved compositions.

According to our invention, stated broadly, a solid dielectric capacitor is provided which comprises a dielectric ceramic body and at least two electrodes in contact therewith. The dielectric ceramic body consists essentially of 100 parts by weight of a major ingredient and from 0.2 to 10.0 parts by weight of a mixture of boric oxide ($B_2O_3$), silicon dioxide ($SiO_2$) and lithium oxide ($Li_2O$). The major ingredient is expressed by the compositional formula:

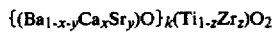

$\{(Ba_{1-x-y}Ca_xSr_y)O\}_k(Ti_{1-z}Zr_z)O_2$ where the subscripts x, y, z and k have the following ranges of values:

$0.02 \leq x \leq 0.27$, $0 < y \leq 0.37$, $0 < z \leq 0.26$, and $1.00 \leq k \leq 1.04$, and where $0.60 \leq (1-x-y) < 0.98$.

The relative proportions of the three additives, $B_2O_3$, $SiO_2$ and $Li_2O$, are also specified herein in reference to a ternary diagram attached hereto.

The ceramic capacitor of our invention, having its dielectric body formulated as set forth above, has a DC breakdown voltage of 25 volts per micron or more at a temperature of 125° C., compared with 13 to 18 volts per micron in accordance with the prior art. Thus, for a given breakdown voltage, the capacitor of our invention can be much smaller in size than that of the prior art.

Our invention also provides a method of fabricating the above ceramic capacitor. There are first prepared the above indicated proportions of the major ingredient and the additives in finely divided form. After being intimately mingled together, the major ingredient and additives are molded into a body of desired shape and size having at least two electrode portions of an electroconductive material. Then the molding with the electrode portions is sinterend in a nonoxidative (i.e. reductive or neutral) atmosphere and is subsequently reheated in an oxidative atmosphere.

We recommend a temperature range of 1000° to 1200° C. for sintering the dielectric body. This temperature range in an nonoxidative atmosphere is sufficiently low to permit the cosintering of nickel or like base metal as electrodes on the dielectric body without the possibility of the flocculation or diffusion of the base metal. Thus, in preferred examples set forth subsequently, monolithic, multilayered ceramic capacitors are produced in accordance with the ceramic composition and method of our invention. The electrode portions are formed on green sheets of the ceramic composition by coating a paste composed principally of a powdered base metal. Several such green sheets with the base metal coatings thereon are stacked up, pressed together, sintered, reheated, and cut into pieces of required size. A number of monolithic capacitors of an improved voltage withstanding capability and other characteristics can thus be fabricated simultaneously at reduced cost.

The above and other features and advantages of our invention and the manner of realizing them will become more apparent, and the invention itself will best be understood, from a study of the following description and appended claims, with reference had to the attached drawings.

DETAILED DESCRIPTION

Figure 1:
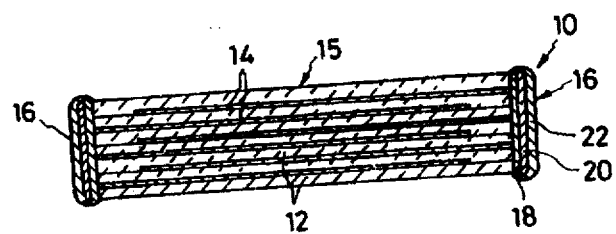
FIG. 1 is a sectional representation of an experimental monolithic, multilayered ceramic capacitor embodying the principles of our invention, the capacitor being representative of numerous test capacitors fabricated in the Examples of our invention to be presented subsequently.

We have illustrated in FIG. 1 one of many monolithic ceramic capacitors fabricated in various Examples of our invention by way of a preferable embodiment thereof. Generally designated 10, the representative capacitor is of multilayered configuration, having an alternating arrangement of seven dielectric ceramic layers 12 and six buried film electrodes 14. The dielectric layers 12 constitute in combination a dielectric body 15 of the improved compositions of our invention, to be detailed subsequently, having the film electrodes 14 buried therein. The film electrodes 14 can be fabricated from a low cost base metal such as nickel. Three of the six film electrodes 14 extend in parallel spaced relation to one another from a first side of the dielectric body 15 toward its second side opposite to the first side and terminate short of the second side. The other three film electrodes 14 extend in parallel spaced relation to one another from the second side of the dielectric body and terminate short of its first side. The two groups of film electrodes 14 are in staggered, interdigitating configuration.

A pair of conductive terminations 16 contact respectively the two groups of film electrodes 14. Each termination 16 comprises a baked on zinc layer 18, a plated on copper layer 20, and a plated on solder layer 22.

EXAMPLES

We fabricated 89 different sets of test capacitors, each constructed as in FIG. 1, some in accordance with the ceramic compositions of our invention and others not, and measured their electrical properties. Table 1 lists the compositions of the dielectric bodies of the test capacitors fabricated. We have generally formulated the major ingredient of the ceramic compositions of our invention as $\{(Ba_{1-x-y}Ca_xSr_y)O\}_k(Ti_{1-z}Zr_z)O_2$. Thus, in Table 1, we have given the specific values of (1-x-y), x, y, k, 1-z, and z. The ceramic compositions of our invention further includes a mixture of additives $B_2O_3$, $SiO_2$, and $Li_2O$. Table 1 specifies the amounts, in parts by weight, of this additive mixture with respect to 100 parts by weight of the major ingredient, and the relative proportions, in mole percent, of the three additives.

TABLE 1

Ceramic Compositions

| No. | Major Ingredient (100 wt. parts) | | | | | | Test Amount (wt. part) | Additives Proportions (mole %) | | |
|---|---|---|---|---|---|---|---|---|---|---|
| | 1-x-y | x | y | k | 1-z | z | | $B_2O_3$ | $SiO_2$ | $Li_2O$ |
| 1 | 0.80 | 0.10 | 0.10 | 1.02 | 0.85 | 0.15 | 3.0 | 10 | 50 | 40 |
| 2 | " | " | " | " | " | " | 1.0 | " | " | " |
| 3 | " | " | " | " | " | " | 7.0 | " | " | " |
| 4 | " | " | " | " | " | " | 12.0 | " | " | " |
| 5 | " | " | " | " | " | " | ... | ... | ... | ... |
| 6 | " | " | " | " | " | " | 0.2 | 60 | 15 | 25 |
| 7 | " | " | " | " | " | " | 1.0 | " | " | " |
| 8 | " | " | " | " | " | " | 3.0 | " | " | " |
| 9 | " | " | " | " | " | " | 5.0 | " | " | " |
| 10 | " | " | " | " | " | " | 7.0 | " | " | " |
| 11 | " | " | " | " | " | " | 10.0 | " | " | " |
| 12 | " | " | " | " | " | " | 12.0 | " | " | " |
| 13 | " | " | " | " | " | " | 3.0 | 2 | 73 | 25 |
| 14 | " | " | " | " | " | " | " | 5 | 75 | 20 |
| 15 | " | " | " | " | " | " | 1.0 | 23 | 35 | 42 |
| 16 | " | " | " | " | " | " | " | 24 | 75 | 1 |
| 17 | " | " | " | " | " | " | " | 25 | 50 | 25 |
| 18 | " | " | " | " | " | " | " | 39 | 60 | 1 |
| 19 | " | " | " | " | " | " | " | 40 | 10 | 50 |
| 20 | " | " | " | " | " | " | " | 45 | 45 | 10 |
| 21 | " | " | " | " | " | " | " | 15 | 40 | 45 |
| 22 | " | " | " | " | " | " | " | 50 | 1 | 49 |
| 23 | " | " | " | " | " | " | " | 60 | 1 | 39 |
| 24 | " | " | " | " | " | " | 2.0 | 80 | 1 | 19 |
| 25 | " | " | " | " | " | " | 3.0 | 84 | 6 | 10 |
| 26 | " | " | " | " | " | " | 1.0 | 90 | 5 | 5 |
| 27 | " | " | " | " | " | " | 3.0 | 89 | 10 | 1 |
| 28 | 0.90 | 0.06 | 0.04 | 1.01 | 0.82 | 0.18 | " | 70 | 20 | 10 |
| 29 | " | " | " | " | " | " | " | 80 | 1 | 19 |
| 30 | " | " | " | " | " | " | " | 64 | 35 | 1 |
| 31 | " | " | " | " | " | " | " | 30 | 35 | 35 |
| 32 | " | " | " | " | " | " | " | 15 | 75 | 10 |
| 33 | " | " | " | " | " | " | " | 10 | 50 | 40 |
| 34 | " | " | " | " | " | " | " | 25 | 25 | 50 |
| 35 | " | " | " | " | " | " | " | 50 | 1 | 49 |
| 36 | 0.61 | 0.02 | 0.37 | 1.00 | 0.99 | 0.01 | 1.0 | 10 | 80 | 10 |
| 37 | " | " | " | " | " | " | " | 5 | 75 | 20 |
| 38 | " | " | " | " | " | " | 0.5 | 23 | 35 | 42 |
| 39 | " | " | " | " | " | " | 2.0 | 2 | 63 | 35 |
| 40 | " | " | " | " | " | " | 1.0 | 39 | 60 | 1 |
| 41 | " | " | " | " | " | " | 3.0 | 45 | 20 | 35 |
| 42 | " | " | " | " | " | " | 5.0 | 60 | 15 | 25 |

TABLE 1-continued

Ceramic Compositions

| | Major Ingredient (100 wt. parts) | | | | | | Test Amount (wt. part) | Additives Proportions (mole %) | | |
|---|---|---|---|---|---|---|---|---|---|---|
| No. | 1-x-y | x | y | k | 1-z | z | | $B_2O_3$ | $SiO_2$ | $Li_2O$ |
| 43 | " | " | " | " | " | " | 3.0 | 60 | 1 | 39 |
| 44 | " | " | " | " | " | " | 2.0 | 89 | 10 | 1 |
| 45 | 0.75 | 0.04 | 0.21 | 0.99 | 0.92 | 0.08 | 3.0 | 70 | 20 | 10 |
| 46 | " | " | " | 1.00 | " | " | " | " | " | " |
| 47 | " | " | " | 1.02 | " | " | " | " | " | " |
| 48 | " | " | " | 1.04 | " | " | " | " | " | " |
| 49 | " | " | " | 1.05 | " | " | " | " | " | " |
| 50 | 0.80 | 0.10 | 0.10 | 0.99 | 0.85 | 0.15 | " | 60 | 15 | 25 |
| 51 | " | " | " | 1.00 | " | " | " | " | " | " |
| 52 | " | " | " | 1.02 | " | " | " | " | " | " |
| 53 | " | " | " | 1.04 | " | " | " | " | " | " |
| 54 | " | " | " | 1.05 | " | " | " | " | " | " |
| 55 | 1.00 | 0 | 0 | 1.01 | 0.80 | 0.20 | " | 5 | 75 | 20 |
| 56 | 0.98 | 0.02 | 0.01 | 1.00 | " | " | 1.0 | 8 | 62 | 30 |
| 57 | 0.93 | 0.02 | 0.05 | 1.04 | 0.74 | 0.26 | 5.0 | 30 | 35 | 35 |
| 58 | 0.80 | " | 0.18 | 1.00 | 0.82 | 0.18 | 2.0 | 64 | 35 | 1 |
| 59 | 0.73 | " | 0.25 | " | 0.99 | 0.01 | 3.0 | 69 | 1 | 30 |
| 60 | 0.61 | " | 0.37 | " | 0.94 | 0.06 | " | 89 | 10 | 1 |
| 61 | 0.70 | 0.04 | 0.26 | 1.01 | 0.95 | 0.05 | 2.0 | 50 | 1 | 49 |
| 62 | 0.68 | " | 0.28 | " | 0.88 | 0.12 | 5.0 | 39 | 15 | 46 |
| 63 | 0.939 | 0.05 | 0.001 | " | 0.96 | 0.04 | 3.0 | 45 | 45 | 10 |
| 64 | 0.79 | " | 0.16 | " | 0.89 | 0.11 | " | 24 | 75 | 1 |
| 65 | 0.93 | 0.06 | 0.01 | 1.04 | 0.74 | 0.26 | 1.0 | 15 | 75 | 10 |
| 66 | 0.78 | 0.08 | 0.14 | 1.02 | 0.88 | 0.12 | " | 23 | 35 | 42 |
| 67 | 0.81 | 0.10 | 0.09 | 1.00 | 0.84 | 0.16 | " | 45 | 30 | 25 |
| 68 | 0.80 | 0.10 | 0.10 | 1.00 | 0.85 | 0.15 | " | 80 | 1 | 19 |
| 69 | 0.76 | 0.22 | 0.02 | 1.01 | 0.80 | 0.20 | 3.0 | 60 | 1 | 39 |
| 70 | 0.71 | 0.27 | " | 1.02 | 0.81 | 0.19 | " | 10 | 50 | 40 |
| 71 | 0.56 | 0.28 | 0.16 | 1.01 | 0.76 | 0.24 | " | 25 | 50 | 25 |
| 72 | 0.97 | 0.02 | 0.01 | 1.04 | 0.80 | 0.20 | " | 39 | 60 | 1 |
| 73 | 0.95 | 0.04 | 0.01 | 1.01 | 0.96 | 0.04 | 0.5 | 25 | 65 | 10 |
| 74 | 0.93 | 0.06 | 0.01 | 1.04 | 0.74 | 0.26 | " | 5 | 75 | 20 |
| 75 | 0.76 | 0.22 | 0.02 | 1.00 | 0.80 | 0.20 | " | 84 | 6 | 10 |
| 76 | 0.75 | 0.04 | 0.21 | 1.03 | 0.92 | 0.08 | " | 45 | 20 | 35 |
| 77 | 0.73 | 0.02 | 0.25 | 1.03 | 0.99 | 0.01 | 2.0 | 24 | 75 | 1 |
| 78 | 0.70 | 0.04 | 0.26 | 1.03 | 0.95 | 0.05 | " | 10 | 50 | 40 |
| 79 | 0.60 | 0.04 | 0.36 | 1.03 | 0.99 | 0.01 | " | 39 | 15 | 46 |
| 80 | 0.58 | 0.06 | " | " | 0.99 | 0.01 | " | 64 | 35 | 1 |
| 81 | 0.53 | 0.08 | 0.39 | 1.01 | 0.86 | 0.14 | 3.0 | 70 | 20 | 10 |
| 82 | 0.84 | 0.04 | 0.12 | 1.01 | 1.00 | 0 | " | 60 | 15 | 25 |
| 83 | 0.61 | 0.02 | 0.37 | 1.00 | 0.99 | 0.01 | " | 45 | 30 | 25 |
| 84 | 0.94 | 0.05 | 0.01 | 1.02 | 0.96 | 0.04 | " | 10 | 50 | 40 |
| 85 | 0.80 | 0.10 | 0.10 | 1.00 | 0.85 | 0.15 | " | 15 | 75 | 10 |
| 86 | 0.71 | 0.27 | 0.02 | 1.00 | 0.81 | 0.19 | " | 39 | 60 | 1 |
| 87 | 0.93 | 0.06 | 0.01 | 1.04 | 0.74 | 0.26 | " | 50 | 1 | 49 |
| 88 | 0.72 | 0.08 | 0.20 | 1.00 | 0.72 | 0.28 | " | 84 | 6 | 10 |
| 89 | 0.81 | 0.17 | 0.02 | 1.01 | 0.82 | 0.18 | " | 45 | 45 | 10 |

In Test No. 1 of Table 1, for instance, the major ingredient of the dielectric bodies of the test capacitors was $\{(Ba_{0.80}Ca_{0.10}Sr_{0.10})O\}_{1.02}(Ti_{0.85}Zr_{0.15})O_2$. One hundred parts by weight of this major ingredient was admixed with 3.0 parts by weight of a mixture of 10 mole percent $B_2O_3$, 50 mole percent $SiO_2$, and 40 mole percent $Li_2O$.

For the fabrication of the test capacitors of Test No. 1, we started with the preparation of the major ingredient. We provided the following start materials:

$BaCO_3$—590.06 grams (81.6 mole parts)
$CaCO_3$—37.56 grams (10.2 mole parts)
$SrCO_3$—55.29 grams (10.2 mole parts)
$TiO_2$—249.35 grams (85.0 mole parts)
$ZrO_2$—67.73 grams (15.0 mole parts)

These start materials had all purities of not less than 99 percent. The above specified weights of the start materials do not include those of the impurities. We charged these start materials into a pot mill together with alumina balls and 2.5 liters of water and mixed them together for 15 hours. Then the mixture was introduced into a stainless steel receptacle and dried by air heated to 150° C. for four hours. Then the dried mixture was crushed into relatively coarse particles, which were subsequently charged into a deep receptacle for firing in air within a tunnel furnace at 1200° C. for two hours. There was thus obtained the major ingredient of the above specified composition in finely divided form.

For the provision of the additive mixture of Test No. 1, we prepared:

$B_2O_3$—10.46 grams (10 mole percent)
$SiO_2$—45.14 grams (50 mole percent)
$Li_2CO_3$—44.40 grams (40 mole percent)

To this mixture we added 300 cubic centimeters of alcohol, and the resulting mixture was stirred for 15 hours in a polyethylene pot with alumina balls. There was thus obtained the desired additive mixture of 10 mole percent $B_2O_3$, 50 mole percent $SiO_2$, and 40 mole percent $Li_2O$.

Then 1000 grams of the above prepared major ingredient and 30 grams of the above prepared additive mixture was mixed together. To this mixture we added 15 percent by weight of an organic binder and 50 percent by weight of water with respect to the total weight of the major ingredient and the additive mixture. The organic binder was an aqueous solution of acrylic ester polymer, glycerine, and condensed phosphate. The mixture of all these was ball milled into a slurry. Then this slurry was defoamed in vacuum. Then the defoamed slurry was introduced into a reverse roll coater thereby to be shaped into a thin, continuous strip on an elongate base strip of polyester film. Then the strip on the base film was dried by heated heated to 100° C. The green (unfired) ceramic strip thus obtained, about 25 microns thick, was subsequently cut into seven "squares" 24, FIG. 2, each sized 10 by 10 centimeters. These green ceramic squares are to become ceramic layers 12, FIG. 1, in the completed test capacitors.

For the provision of the base metal film electrodes 14 on the ceramic layers 12, we prepared 10 grams of nickel in finely divided form, with an average particle size of 1.5 microns, and a solution of 0.9 gram of ethyl cellulose in 9.1 grams of butyl "Carbitol" (trademark for diethylene glycol monobutyl ether). Both were agitated for 10 hours to provide an electroconductive paste. Then this paste was screen printed in rectangular patterns, each sized 2.5 by 7.0 millimeters, on one surface of each of all but one of the seven green ceramic squares 24 which had been prepared as above.

Figure 2:
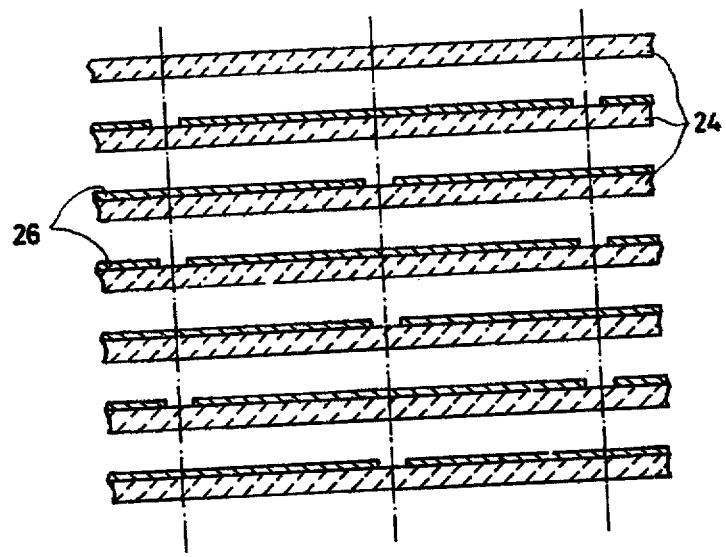
FIG. 2 is a fragmentary section through a plurality of green ceramic sheets, having an electroconductive paste coated thereon in a required electrode pattern, to be processed into monolithic, multilayered capacitors each constructed as in FIG. 1.

FIG. 2 indicates at 26 the printings of the electroconductive paste on the six green ceramic sequres 24. It will be observed that the printings 26 on the first, third and fifth squares, counted from top to bottom in FIG. 2, are offset from those on the second, fourth and sixth squares approximately one half of their longitudinal dimensions.

After drying the printed paste at 50° C. for 30 minutes, the six green ceramic squares 24 with the printings 26 thereon were stacked up, with their printings directed upwardly. The other one square which had not been printed was placed on top of the stack of six printed squares, as in FIG. 3. Then the stack of seven squares was pressed in their thickness direction under a pressure of approximately 40 tons at 50° C., thereby firmly uniting them together. Then the united squares were cut in a latticed pattern, as indicated by the dot and dash lines in FIG. 2, into 400 pices.

We employed a furnace capable of atmosphere control for cofiring the above prepared green dielectric bodies having buried therein the electroconductive layers which were to become the film electrodes 14. The bodies were first air heated in the furnace to 600° C. at a rate of 100° C. per hour, thereby driving off the organic binder that had been used for providing the slurry of the powdered major ingredient and additive mixture. Then, with the furnace atmosphere changed from air to a reductive (nonoxidative) one consisting of two percent by volume of molecular hydrogen and 98 percent by volume of molecular nitrogen, the furnace temperature was raised from 600° C. to 1090° C. at a rate of 100° C. per hour. The maximum temperature of 1090° C., at which the ceramic bodies were sintered to maturity, was maintained for three hours. Then the furnace temperature was lowered to 600° C. at a rate of 100° C. per hour. Then the furnace temperature was returned to air (oxidative atmosphere), and the temperature of 600° C. was maintained for 30 minutes in that atmosphere for the oxidative heat treatment of the sintered bodies. Then the furnace temperature was allowed to drop to room temperature.

There were thus obtained the dielectric ceramic bodes 15, FIG. 1, cosintered with the film electrodes 14 buried therein. Each dielectric layer 12 had a thickness of 0.02 millimeter. That portion of each film electrode 14 which is opposed to a portion of the neighboring film electrode had an area of approximately five square millimeters (1.93×2.60). The total area of the opposed portions of the six film electrodes 14 was approximately 30 square millimeters.

We found that the composition of the sintered ceramic bodies 15 was substantially the same as that before sintering. It is reasoned, therefore, that the ceramic bodies 15 are of composite perovskite structures, with the additive mixture (10 mole percent $B_2O_3$, 50 mole percent $SiO_2$ and 40 mole percent $Li_2O$) uniformly dispersed among the crystal grains of the major ingredient, $\{(Ba_{0.80}Ca_{0.10}Sr_{0.10})O\}_{1.02}(Ti_{0.85}Zr_{0.15})O_2$. The (Ba.-Ca.Sr)(Ti.Zr)$O_3$ ceramics, so to say, of our invention contain $BaTiO_3$, $BaZrO_3$, $CaTiO_3$, $CaZrO_3$, $SrTiO_3$, and $SrZrO_3$, and the ingredients of the additive mixture among the crystal grains. In cases where k is greater than 1 in the formula of the major ingredient, excess quantities of BaO, CaO and SrO are contained with respect to the perovskite crystals.

Following the firing of the ceramic bodies 15 we proceeded to the production of the pair of conductive terminations 16 on both sides of each ceramic body. First, for the production of the inmost zinc layers 18, an electroconductive paste of zine, glass frit and vehicle was coated on both sides of each ceramic body 15. The coatings were dried and air heated at 550° C. for 15 minutes, thereby completing the zinc layers 18 each in direct contact with three of the six film electrodes 14 buried in the ceramic body 15. Then the intermediate copper layers 20 were formed on the zinc layers 18 by electroless plating. The outermost solder layers 22 were formed subsequently by electroplating a lead tin alloy on the copper layers 20.

We have thus completed the fabrication of monolithic, multilayered ceramic test capacitors, each constructed as in FIG. 1, in accordance with the ceramic composition of Test No. 1 of Table 1. As regards the other ceramic compositions of Table 1, designated Tests Nos. 2 through 89, we manufactured similar monolithic, multilayered capacitors through exactly the same procedure as that of Test No. 1 except for the temperature of firing in the reductive (nonoxidative) atmosphere.

Ten random samples of the 400 capacitors of each Test were then tested as to their specific dielectric constant, dielectric loss, resistivity, and d.c. breakdown voltage. We measured these electrical properties as follows:

1. Specific Dielectric Constant

The capacitance of each test capacitor was first measured at a temperature of 20° C., a frequency of one kilohertz, and an effectove voltage of 0.5 volt. Then the specific dielectric constant was computed from the capacitance measurement, the total area (25 square millimeters) of the opposed parts of the film electrodes 14, and the thickness (0.02 millimeter) of each ceramic layer 12.

2. Dielectric Loss

Under the same conditions as the specific dielectric constant.

3. Resistivity

Resistance between the pair of conductive terminations 16 of each test capacitor was measured after the application of a direct current at 50 volts for one minute at 20° C. Then resistivity was computed from the resistance measurement and the size of each test capacitor.

4. DC Breakdown Voltage

The test capacitors were introduced into a thermostatic oven, in which they were maintained at 125° C. for 30 minutes. Then, at that temperature, a DC voltage was impressed across each test capacitor and was increased at a rate of 100 volts per second, until the test capacitor broke down. The voltage measurement at the breakdown of each test capacitor was divided by the thickness, 0.02 millimeter (20 microns) of each ceramic layer 12.

Table 2 gives the results of the measurements by the above methods, as well as the temperatures of firing in the reductive atmosphere. It will be seen from this table that the specific dielectric constants of the Test No. 1 capacitors, for instance, averaged 12,400, their dielectric losses 1.2 percent, their resistivities $3.13 \times 10^6$ megohm-centimeters, and their DC breakdown voltages 33.1 volts per micron, that is, 662 volts for the thickness (20 microns) of each ceramic layer 12.

TABLE 2

Sintering Temperature & Capacitor Characteristics

| Test No. | Sintering Tem., °C. | Specific Dielectric Constant | Dielectric Loss, % | Resistivity, megohm-cm | DC Breakdown Voltage, V/micron |
|---|---|---|---|---|---|
| 1 | 1090 | 12400 | 1.2 | $3.13 \times 10^6$ | 33.1 |
| 2 | 1120 | 13500 | 1.0 | $2.86 \times 10^6$ | 28.3 |
| 3 | 1070 | 10500 | 1.0 | $4.51 \times 10^6$ | 26.2 |
| 4 | 1040 | 7100 | 4.3 | $2.95 \times 10^6$ | 23.2 |
| 5 | 1350 | 13700 | 5.2 | $1.32 \times 10^6$ | 3.3 |
| 6 | 1180 | 13800 | 1.5 | $2.57 \times 10^6$ | 26.3 |
| 7 | 1130 | 13400 | 1.3 | $3.42 \times 10^6$ | 32.1 |
| 8 | 1080 | 12600 | 1.2 | $3.69 \times 10^6$ | 36.4 |
| 9 | 1070 | 10810 | 1.4 | $3.95 \times 10^6$ | 32.1 |
| 10 | 1050 | 9280 | 1.2 | $4.02 \times 10^6$ | 29.7 |
| 11 | 1030 | 8210 | 1.5 | $4.54 \times 10^6$ | 28.2 |
| 12 | 1020 | 6230 | 4.5 | $2.65 \times 10^6$ | 21.5 |
| 13 | 1090 | 12300 | 2.6 | $2.70 \times 10^6$ | 11.4 |
| 14 | " | 12800 | 1.3 | $3.15 \times 10^6$ | 27.4 |
| 15 | 1120 | 13200 | 1.1 | $3.45 \times 10^6$ | 33.1 |
| 16 | 1140 | 12900 | 1.2 | $4.16 \times 10^6$ | 42.5 |
| 17 | 1120 | 13400 | 1.4 | $3,83 \times 10^6$ | 38.7 |
| 18 | 1130 | 13100 | 1.3 | $4.05 \times 10^6$ | 46.3 |
| 19 | 1120 | 12600 | 1.8 | $1.85 \times 10^6$ | 16.4 |
| 20 | " | 13200 | 1.2 | $3.96 \times 10^6$ | 41.2 |
| 21 | " | 13300 | 1.0 | $3.72 \times 10^6$ | 17.5 |
| 22 | 1100 | 13600 | 1.5 | $2.85 \times 10^6$ | 27.4 |
| 23 | " | 13100 | 1.1 | $3.24 \times 10^6$ | 36.5 |
| 24 | 1110 | 13100 | 1.2 | $3.81 \times 10^6$ | 38.4 |
| 25 | 1080 | 12800 | 1.3 | $4.14 \times 10^6$ | 41.9 |
| 26 | 1120 | 12500 | 4.6 | $2.87 \times 10^6$ | 16.5 |
| 27 | 1080 | 12300 | 2.4 | $3.27 \times 10^6$ | 44.3 |
| 28 | 1080 | 13210 | 1.3 | $2.98 \times 10^6$ | 38.2 |
| 29 | 1070 | 13350 | 1.1 | $2.75 \times 10^6$ | 35.4 |
| 30 | 1080 | 13280 | 1.1 | $2.88 \times 10^6$ | 43.2 |
| 31 | " | 13210 | 1.2 | $2.82 \times 10^6$ | 34.2 |
| 32 | 1090 | 13290 | 1.3 | $2.84 \times 10^6$ | 38.5 |
| 33 | 1090 | 13370 | 1.0 | $2.71 \times 10^6$ | 28.4 |
| 34 | 1080 | 13240 | 2.2 | $2.83 \times 10^6$ | 16.3 |
| 35 | 1070 | 13310 | 1.1 | $2.91 \times 10^6$ | 32.2 |
| 36 | 1200 | Not coherently bonded on firing. | | | |
| 37 | 1140 | 5170 | 0.8 | $7.24 \times 10^6$ | 31.4 |
| 38 | 1160 | 5670 | 0.7 | $7.34 \times 10^6$ | 28.6 |
| 39 | 1110 | 5130 | 0.8 | $7.41 \times 10^6$ | 14.6 |
| 40 | 1130 | 5320 | 1.0 | $7.27 \times 10^6$ | 36.2 |
| 41 | 1080 | 5160 | 1.2 | $7.35 \times 10^6$ | 38.2 |
| 42 | 1060 | 5050 | 1.1 | $7.67 \times 10^6$ | 37.3 |
| 43 | 1080 | 5150 | 1.0 | $7.33 \times 10^6$ | 35.2 |
| 44 | 1120 | 5140 | 1.1 | $7.42 \times 10^6$ | 42.4 |
| 45 | 1080 | 7720 | 13.5 | $4.23 \times 10^3$ | 2.7 |
| 46 | " | 7570 | 1.0 | $5.13 \times 10^6$ | 41.7 |
| 47 | " | 7430 | 1.1 | $5.35 \times 10^6$ | 42.2 |
| 48 | 1100 | 7140 | 1.0 | $5.55 \times 10^6$ | 44.4 |
| 49 | 1200 | Not coherently bonded on firing. | | | |
| 50 | 1090 | 11100 | 16.3 | $4.52 \times 10^3$ | 2.6 |
| 51 | " | 13100 | 1.1 | $2.96 \times 10^6$ | 27.1 |
| 52 | " | 12900 | 1.2 | $3.42 \times 10^6$ | 35.6 |
| 53 | " | 12300 | 1.0 | $3.65 \times 10$ | 38.6 |
| 54 | 1200 | Not coherently bonded on firing. | | | |

TABLE 2-continued

Sintering Temperature & Capacitor Characteristics

| Test No. | Sintering Tem., °C. | Specific Dielectric Constant | Dielectric Loss, % | Resistivity, megohm-cm | DC Breakdown Voltage, V/micron |
|---|---|---|---|---|---|
| 55 | 1100 | 11830 | 5.2 | $1.45 \times 10^3$ | 4.8 |
| 56 | 1140 | 13720 | 1.0 | $2.88 \times 10^6$ | 26.5 |
| 57 | 1050 | 5120 | 1.3 | $7.84 \times 10^6$ | 38.7 |
| 58 | 1120 | 5730 | 1.0 | $6.35 \times 10^6$ | 39.2 |
| 59 | 1070 | 7790 | 1.3 | $4.55 \times 10^6$ | 37.5 |
| 60 | " | 5040 | 0.8 | $7.28 \times 10^6$ | 46.7 |
| 61 | 1110 | 9420 | 1.2 | $3.92 \times 10^6$ | 28.6 |
| 62 | 1050 | 5820 | 1.4 | $6.47 \times 10^6$ | 33.7 |
| 63 | 1080 | 5710 | 1.1 | $6.62 \times 10^6$ | 42.1 |
| 64 | 1090 | 7650 | 1.5 | $4.71 \times 10^6$ | 41.0 |
| 65 | 1150 | 6130 | 1.2 | $6.15 \times 10^6$ | 36.5 |
| 66 | 1140 | 12210 | 0.9 | $3.11 \times 10^6$ | 30.3 |
| 67 | " | 10720 | 1.2 | $3.55 \times 10^6$ | 34.1 |
| 68 | 1130 | 13340 | 1.1 | $2.78 \times 10^6$ | 38.2 |
| 69 | 1070 | 7050 | 0.9 | $5.62 \times 10^6$ | 33.2 |
| 70 | 1080 | 10490 | 0.9 | $3.48 \times 10^6$ | 28.5 |
| 71 | " | 2570 | 0.7 | $8.71 \times 10^6$ | 35.3 |
| 72 | 1090 | 8730 | 1.2 | $4.21 \times 10^6$ | 47.5 |
| 73 | 1180 | 5610 | 1.2 | $6.73 \times 10^6$ | 28.4 |
| 74 | " | 6030 | 1.0 | $5.85 \times 10^6$ | 26.7 |
| 75 | 1170 | 9020 | " | $5.27 \times 10^6$ | 32.1 |
| 76 | " | 7830 | 0.9 | $4.87 \times 10^6$ | 26.6 |
| 77 | 1120 | 7930 | 1.4 | $4.73 \times 10^6$ | 37.2 |
| 78 | 1110 | 9190 | 1.0 | $3.87 \times 10^6$ | 31.5 |
| 79 | 1100 | 5070 | 1.0 | $6.95 \times 10^6$ | 34.8 |
| 80 | 1110 | 4510 | 1.1 | $7.18 \times 10^6$ | 44.7 |
| 81 | 1080 | 1180 | 0.4 | $1.08 \times 10^7$ | 42.2 |
| 82 | " | 1540 | 6.1 | $6.06 \times 10^6$ | 18.2 |
| 83 | " | 5190 | 1.0 | $7.24 \times 10^6$ | 30.3 |
| 84 | " | 5370 | 1.2 | $6.76 \times 10^6$ | 28.2 |
| 85 | 1090 | 13820 | 1.1 | $2.99 \times 10^6$ | 39.2 |
| 86 | " | 10320 | 1.4 | $3.62 \times 10^6$ | 42.5 |
| 87 | 1070 | 6340 | 1.3 | $6.24 \times 10^6$ | 33.6 |
| 88 | " | 1790 | 0.5 | $8.41 \times 10^6$ | 41.5 |
| 89 | 1080 | 13590 | 1.0 | $2.82 \times 10^6$ | 42.4 |

Prior to a study of the results of Table 2 we will determine the acceptable criteria of the four electrical properties in question for the ceramic capacitors provided by our invention. These criteria are:

Specific dielectric constant: At least 5000.

Dielectric loss: Not more than 2.5 percent.

Resistivity: Not less than $1 \times 10^4$ megohm-centimeters.

DC breakdown voltage: Not less than 25 volts per micron.

An examination of Table 2 in light of the above established criteria of favorable electrical characteristics will reveal that the capacitors of Tests Nos. 4, 5, 12, 13, 19, 21, 26, 34, 36, 39, 45, 49, 50, 54, 55, 71, 80, 81, 82 and 88 do not meet the criteria. Accordingly these capacitors fall outside the scope of our invention. All the other test capacitors satisfy the criteria, with their specific dielectric constants ranging from 5040 to 13,820, their dielectric losses ranging from 0.7 to 2.4 percent, their resistivities ranging from $2.57 \times 10^6$ to $8.71 \times 10^6$ megohm-centimeters, and their DC breakdown voltages ranging from 26.2 to 47.5 volts per micron.

Now, let us consider the ceramic compositions of Table 1 and the corresponding capacitor characteristics, as well as the firing temperatures, of Table 2 in more detail. The ceramic composition of Test No. 5 contained no additive mixture specified by our invention. The resulting dielectric bodies had to be heated to as high as 1350° C. for sintering to maturity. Further the resulting capacitors had a dielectric loss of as high as 5.2 percent and a DC breakdown voltage of as low as 3.3 volts per micron. Take the ceramic composition of Test No. 6 for comparison. It includes 0.2 parts by weight of the additive misture with respect to 100 parts by weight of the major ingredient. Even though the firing temperature was as low as 1180° C., the Test No. 6 capacitors possess the electrical characteristics coming up to the above criteria. We set, therefore, the lower limit of the possible proportions of the additive mixture at 0.2 part by weight with respect to 100 parts by weight of the major ingredient.

The ceramic compositions of Tests Nos. 4 and 12 contained as much as 12 parts by weight of the additive mixture. The resulting Tests Nos. 4 and 12 capacitors had dielectric losses of 4.3 and 4.5 percent, respectively, which are higher than the desired criterion. However, when the proportion of the additive mixture was reduced to 10 parts by weight, as in Test No. 11, the resulting capacitors had the desired characteristics. Accordingly, the upper limit of the possible proportions of the additive mixture is set at 10 parts by weight with respect to 100 parts by weight of the major ingredient.

Tests Nos. 1 through 44 are intended primarily to exhibit the effects of the various compositions and proportions of the additive mixture on the characteristics of the resulting capacitors. We have ascertained from these Tests that the acceptable relative proportions of $B_2O_3$, $SiO_2$ and $Li_2O$, constituting the additive mixture in accordance with the invention, can be defined in terms of the ternary diagram of FIG. 3. We have indicated the following points in this diagram:

1. Point A: 10 mole percent $B_2O_3$, 50 mole percent $SiO_2$, and 40 mole percent $Li_2O$ (Tests Nos. 2 and 33).
2. Point B: 50 mole percent $B_2O_3$, one mole percent $SiO_2$, and 49 mole percent $Li_2O$ (Tests Nos. 22 and 35).
3. Point C: 80 mole percent $B_2O_3$, one mole percent $SiO_2$, and 19 mole percent $Li_2O$ (Test No. 29).
4. Point D: 89 mole percent $B_2O_3$, 10 mole percent $SiO_2$, and one mole percent $Li_2O$ (Test No. 44).
5. Point E: 24 mole percent $B_2O_3$, 75 mole percent $SiO_2$, and one mole percent $Li_2O$ (Test No. 16).
6. Point F: Five mole percent $B_2O_3$, 75 mole percent $SiO_2$, and 20 mole percent $Li_2O$ (Tests Nos. 14 and 37).

Figure 3:
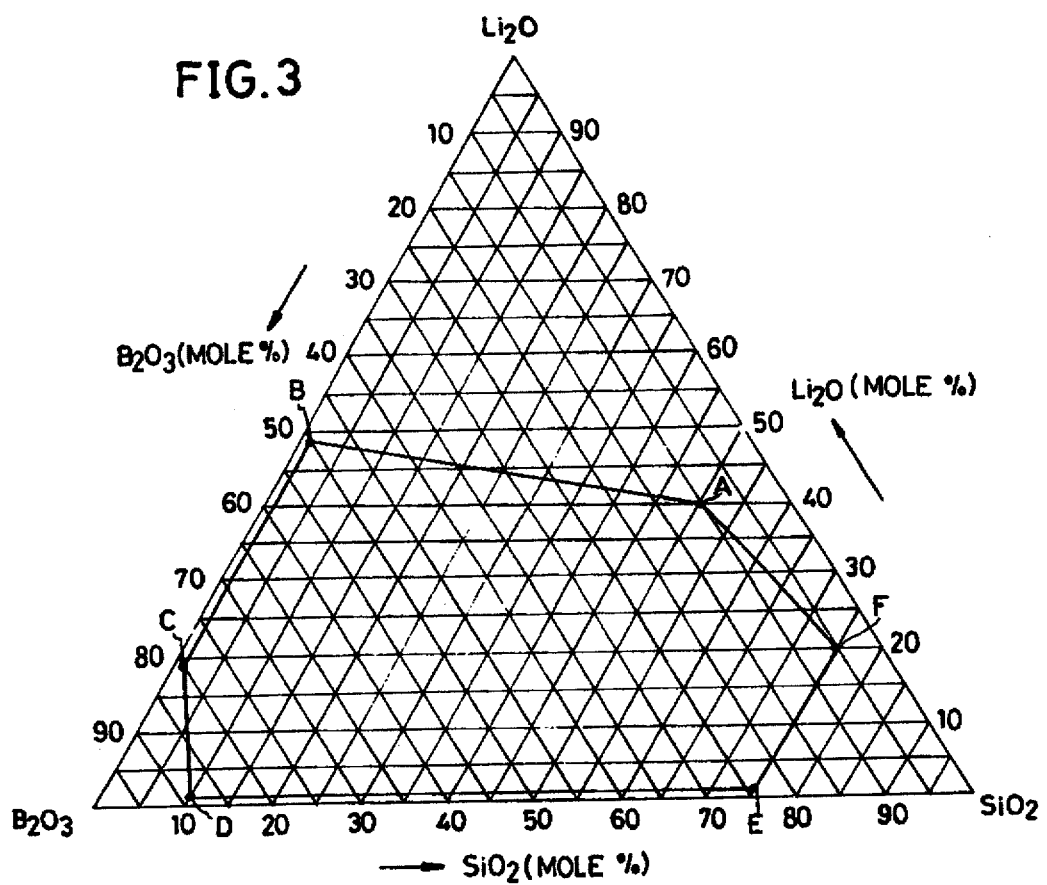
FIG. 3 is a ternary diagram indicating the relative proportions of the additives of the ceramic compositions in accordance with our invention.

The relative proportions of the three ingredients of the additive mixture in accordance with our invention all fall within the region bounded by the lines sequentially connecting the above points A through F in the ternary diagram of FIG. 3. Table 2 proves that the additive compositions within this region makes possible the provision of capacitors of the desired electrical characteristics. The additive compositions of Tests Nos. 13, 19, 21, 26, 34 and 39 are all outside that region, and the corresponding capacitors had breakdown voltages of not more than only 20 volts per micron. The dielectric bodies of Test No. 36 were not coherently bonded on firing.

Tests Nos. 45 through 54 were intended to ascertain the effects of the various values of k in the formula of the major ingredient on the characteristics of the resulting capacitors. The value of k was set at 0.99 in Tests Nos. 45 and 50. The dielectric losses, resistivities, and breakdown voltages of the resulting capcitors were much worse than the desired values. However, when the value of k was increased to 1.05 as in Tests Nos. 49 and 54, the resulting dielectric bodies were not coherently bonded on firing. As demonstrated by Tests Nos. 46, 47, 48, 51, 52 and 53, the capacitors of the desired characteristics could be obtained when the values of k were in the range of 1.00 through 1.04.

The values of x, y, z and k in the general formular of the major ingredient were variously determined in Tests Nos. 55 through 89 to test the various proportions of barium (Ba), calcium (Ca), strontium (Sr), titanium (Ti) and zirconium (Zr). Both x and y were zero, with Ca and Sr deleted from the major ingredient, in Test No. 55. The resulting dielectric bodies were difficult of oxidation by the heat treatment at 600° C., and the dielectric losses, resistivities, and breakdown voltages of the resulting capacitors did not come up to the desired criteria. Contrastively, the desired characteristics were obtained by the Test No. 56 capacitors in which x was 0.02. However, when the value x was made as much as 0.28 as in Test No. 71, the specific dielectric constant became lower then the criterion. The desired electrical characteristics could all be obtained when x was 0.27 as in Test No. 70. We conclude from these findings that the values of x should be in the range of 0.02 to 0.27.

The value of y in the formula of the major ingredient was set at 0.39 in Test No. 81. The specific dielectric constant of the resulting capacitors was below the criterion. The capacitor characteristics were all satisfactory when the value of y was set at 0.37 and 0.001 as in Tests Nos. 60 and 63. Consequently, the value of y should be not more than 0.37. Additional experiment has proved that even if the value of y is less than 0.001, capacitors of better characteristics are obtainable than if y is zero.

The value of (1-x-y) in the formula of the major ingredient was set at 0.60 in Test No. 79, and the resulting capacitors possessed the desired characteristics. However, when the value was lowered to 0.58 as in Test No. 80, the specific dielectric constant of the resulting capacitors become lower than the criterion. The lowermost possible value of (1-x-y) is therefore 0.60. The highest possible value of (1-x-y) must be less than 0.98 since, as we have specified above, x is at least 0.02 and y is at least greater than zero.

Test No. 82 indicates that the specific dielectric constant and dielectric loss of the capacitors are poor if z is zero. Test No. 88 proves, on the other hand, that the specific dielectric constant also becomes poor if the value of z is made as high as 0.28. The desired electrical characteristics could all be obtained if the value of z was in the range of 0.01 to 0.26 as in Tests Nos. 83 through 87. Additional experiment has proved that even if the value of z is less than 0.01, capacitors of better characteristics are obtainable than if z is zero. Thus the value of z must be greater than zero and not more than 0.26. Consequently, (1-z) is at least 0.74 and less than one.

By way of comparison of our invention with what we believe to be the closest prior art, we manufactured, as Tests Nos. 90 through 97, capacitors of exactly the same size and construction as those set forth in connection with Test No. 1, only with the ceramic compositions formulated in the aforesaid Japanese Laid Open Patent Application No. 59-138003. These test capacitors were fabricated by the same method as in Tests Nos. 1 through 89. Table 3 lists the prior art ceramic compositions of Tests Nos. 90 through 97, and Table 4 the firing temperatures of the ceramic bodies and the four electrical properties in question of the resulting capacitors. The electrical properties were also measured by the same methods as with Test Nos. 1 through 89.

TABLE 3

| Test No. | Major Ingredient (100 wt. parts) | | | | | | Additives | | | | | | |
|---|---|---|---|---|---|---|---|---|---|---|---|---|---|
| | | | | | | | Amount | Proportions (mole %) | | | MO (mole %) | | |
| | 1-x-y | x | y | k | 1-z | z | (wt. part) | MO | SiO$_2$ | Li$_2$O | BaO | SrO | CaO |
| 90 | 0.78 | 0.10 | 0.12 | 1.01 | 0.86 | 0.14 | 3.0 | 20 | 50 | 30 | 40 | 30 | 30 |
| 91 | 0.90 | 0.06 | 0.04 | 1.00 | 0.82 | 0.18 | 3.0 | 20 | 60 | 20 | 20 | 40 | 40 |
| 92 | 0.89 | 0.03 | 0.08 | " | 0.90 | 0.10 | 0.5 | 10 | 55 | 35 | 35 | 45 | 20 |
| 93 | 0.68 | 0.04 | 0.28 | " | 0.88 | 0.12 | 1.0 | 25 | 60 | 15 | 15 | 35 | 50 |
| 94 | 0.93 | 0.06 | 0.01 | 1.04 | 0.74 | 0.26 | 1.0 | 5 | 55 | 40 | 20 | 70 | 10 |
| 95 | 0.71 | 0.27 | 0.02 | 1.00 | 0.81 | 0.19 | 1.0 | 30 | 50 | 20 | 40 | 30 | 30 |
| 96 | 0.78 | 0.10 | 0.12 | 1.01 | 0.86 | 0.14 | 1.0 | 2 | 50 | 48 | 40 | 30 | 30 |
| 97 | 0.90 | 0.06 | 0.04 | 1.00 | 0.82 | 0.18 | 1.0 | 30 | 65 | 5 | 20 | 40 | 40 |

TABLE 4

Sintering Temperature & Capacitor Characteristics (Prior Art)

| Test No. | Sintering Temp., °C. | Specific Dielectric Constant | Dielectric Loss, % | Resistivity, megohm-cm | DC Breakdown Voltage, V/micron |
|---|---|---|---|---|---|
| 90 | 1080 | 12230 | 1.0 | 3.18 × 10$^6$ | 13.7 |
| 91 | 1090 | 13530 | 1.2 | 2.79 × 10$^6$ | 14.2 |
| 92 | 1140 | 5680 | 1.4 | 6.62 × 10$^6$ | 16.2 |
| 93 | 1130 | 5760 | 1.2 | 6.53 × 10$^6$ | 17.3 |
| 94 | 1130 | 6280 | 1.2 | 6.01 × 10$^6$ | 17.9 |
| 95 | 1130 | 10530 | 0.9 | 3.65 × 10$^6$ | 15.1 |
| 96 | 1090 | 12310 | 1.4 | 3.06 × 10$^6$ | 10.7 |
| 97 | 1120 | 13350 | 1.2 | 2.88 × 10$^6$ | 16.5 |

As will be seen from Table 4, the DC breakdown voltages of the prior art capacitors of Tests Nos. 90 through 97 all fall short of the criterion of 25 volts per micron. It is therefore apparent that our invention has succeeded in marked improvement in the breakdown voltages of the capacitors of the class under consideration.

Although we have disclosed our invention in terms of specific Examples thereof, we understand that our invention is not to be limited by the exact detals of such disclosure but is susceptible to a variety of modifications within the usual knowledge of the ceramics or chemicals specialists without departing from the scope of our invention. The following, then, is a brief list of such possible modifications:

1. The ceramic compositions of our invention might include various additives not disclosed herein. An example is a mineralizer such as manganese dioxide. Used in a proportion (preferably from 0.05 to 0.10 percent by weight) not adversely affecting the desired properties of the resulting capacitors, such a mineralizer would improve the sinterability of the dielectric bodies.

2. The start materials of the major ingredient might be substances other than those employed in the Examples herein, such as BaO, SrO, CaO and other oxides or hydroxides. The start materials of the additive mixture might also be other oxides, hydroxides, etc.

3. The temperature of reheating in an oxidative atmosphere might be variously determined in a range (from 500° to 1000° C. for the best results) less than the sintering temperature (from 1000° to 1200° C.), in consideration of such factors as the particular base metal electrode material in use and the degree of oxidation required.

4. The temperature of cosintering in a nonoxidative atmosphere might also be changed in consideration of the particular electrode material in use.

5. The dielectric bodies with the buried electrodes could be sintered in a neutral, instead of reductive, atmosphere.

6. The ceramic compositions of our invention might be used as the dielectric bodies of capacitors other than those of the monolithic, multilayered configuration disclosed herein. In its simplest form, therefore, the capacitor fabricated in accordance with our invention would comprise a dielectric body and two electrodes in contact therewith.

We claim:

1. A solid dielectric capacitor comprising a dielectric ceramic body and at least two electrodes in contact therewith, the dielectric ceramic body consisting essentially of:

100 parts by weight of a major ingredient expressed by the formula,

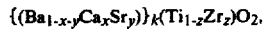

$\{(Ba_{1-x-y}Ca_xSr_y)\}_k(Ti_{1-z}Zr_z)O_2,$ where x is a numeral in the range of 0.02 to 0.27;

y is a numeral greater than zero and not more than 0.37;

z is a numeral greater than zero and not more than 0.26;

k is a numeral in the range of 1.00 to 1.04; and (1-x-y) has a value not less than 0.60 and less than 0.98; and from 0.2 to 10.0 parts by weight of an additive mixture of boric oxide, silicon dioxide and lithium oxide, the relative proportions of boric oxide, silicon dioxide and lithium oxide being in the range of that region of the ternary diagram of FIG. 3 attached hereto which is bounded by the lines sequentially connecting:

the point A where the additive mixture consists of 10 mole percent boric oxide, 50 mole percent silicon dioxide, and 40 mole percent lithium oxide;

the point B where the additive mixture consists of 50 mole percent boric oxide, one mole percent silicon dioxide, and 49 mole percent lithium oxide;

the point C where the additive mixture consists of 80 mole percent boric oxide, one mole percent silicon dioxide, and 19 mole percent lithium oxide;

the point D where the additive mixture consists of 89 mole percent boric oxide, 10 mole percent silicon dioxide, and one mole percent lithium oxide;

the point E where the additive mixture consists of 24 mole percent boric oxide, 75 mole percent silicon dioxide, and one mole percent lithium oxide; and the point F where the additive mixture consists of five mole percent boric oxide, 75 mole percent silicon dioxide, and 20 mole percent lithium oxide.

2. The solid dielectric capacitor as set forth in claim 1, wherein the electrodes are buried in the dielectric ceramic body.

3. The solid dielectric capacitor as set forth in claim 1, wherein the electrodes are of a base metal.

4. The solid dielectric capacitor as set forth in claim 3, wherein the base metal is nickel.

5. The solid dielectric capacitor as set forth in claim 1, wherein the dielectric ceramic body has a DC breakdown voltage of at least 25 volts per micron.

6. A process for the manufacture of a solid dielectric capacitor providing a mixture of:
(a) 100 parts by weight of $\{(Ba_{1-x-y}Ca_xSr_y)O\}_k(Ti_{1-z}Zr_z)O_2$ in finely divided form, where
x is a numeral in the range of 0.02 to 0.27;
y is a numeral greater than zero and not more than 0.37;
z is a numeral greater than zero and not more than 0.26;
k is a numeral in the range of 1.00 to 1.04; and
(1-x-y) has a value not less than 0.60 and less than 0.98; and
(b) from 0.2 to 10.0 parts by weight of an additive mixture of boric oxide, silicon dioxide and lithium oxide in finely divided form, the relative proportions of boric oxide, silicon dioxide and lithium oxide being in the range of that region of the ternary diagram of FIG. 3 attached hereto which is bounded by the lines sequentially connecting:
the point A where the additive mixture consists of 10 mole percent boric oxide, 50 mole percent silicon dioxide, and 40 mole percent lithium oxide;
the point B where the additive mixture consists of 50 mole percent boric oxide, one mole percent silicon dioxide, and 49 mole percent lithium oxide;
the point C where the additive mixture consists of 80 mole percent boric oxide, one mole percent silicon dioxide, and 19 mole percent lithium oxide;
the point D where the additive mixture consists of 89 mole percent boric oxide, 10 mole percent silicon dioxide, and one mole percent lithium oxide;
the point E where the additive mixture consists of 24 mole percent boric oxide, 75 mole percent silicon dioxide, and one mole percent lithium oxide; and
the point F where the additive mixture consists of five mole percent boric oxide, 75 mole percent silicon dioxide, and 20 mole percent lithium oxide;
molding the mixture into desired shape and size, the molding having at least two electrode portions of an electroconductive material;
cosintering the molding and the electrode portions to maturity in a nonoxidative atmosphere; and
reheating the sintered molding and electrode portions in an oxidative atmosphere.

7. The process for the fabrication of a solid dielectric capacitor as set forth in claim 6, wherein the electrode portions are formed on the molding by coating a paste composed principally of a base metal.

8. The process for the fabrication of a solid dielectric capacitor as set forth in claim 7, wherein the base metal is nickel.

9. The process for the fabrication of a solid dielectric capacitor as set forth in claim 6, wherein the molding and the electrode portions are cosintered in a temperature range of 1000° to 1200° C.

10. The process for the fabrication of a solid dielectric capacitor as set forth in claim 9, wherein the sintered molding and electrode portions are reheated in a temperature range of 500° to 1000° C.

* * * * *